United States Patent
Cerchio et al.

(10) Patent No.: US 10,178,495 B2
(45) Date of Patent: Jan. 8, 2019

(54) SYSTEMS AND METHODS TO DETERMINE A LOCATION OF A MOBILE DEVICE

(71) Applicant: OneMarket Network LLC, San Francisco, CA (US)

(72) Inventors: Gerard Joseph Cerchio, San Francisco, CA (US); Brian David Wilson, Fountain Hills, AZ (US)

(73) Assignee: OneMarket Network LLC, San Francisco, CA (US)

( * ) Notice: Subject to any disclaimer, the term of this patent is extended or adjusted under 35 U.S.C. 154(b) by 0 days.

(21) Appl. No.: 15/374,874

(22) Filed: Dec. 9, 2016

(65) Prior Publication Data
US 2018/0109921 A1   Apr. 19, 2018

Related U.S. Application Data

(60) Provisional application No. 62/408,264, filed on Oct. 14, 2016, provisional application No. 62/408,261, (Continued)

(51) Int. Cl.
*H04W 4/02* (2018.01)
*H04W 64/00* (2009.01)
(Continued)

(52) U.S. Cl.
CPC .............. *H04W 4/02* (2013.01); *G01C 21/18* (2013.01); *G01C 21/206* (2013.01);
(Continued)

(58) Field of Classification Search
CPC ....... H04W 4/02; H04W 4/008; H04W 4/023; H04W 4/026; H04W 4/027;
(Continued)

(56) References Cited

U.S. PATENT DOCUMENTS 8,179,816 B1   5/2012   Vaidyanathan et al.
8,781,502 B1   7/2014   Middleton et al.
(Continued)

FOREIGN PATENT DOCUMENTS

WO   2014065540   5/2014
WO   2015049660   4/2015
(Continued)

OTHER PUBLICATIONS

European Patent Application No. 16177365.0, Search Report, dated Dec. 7, 2016.

(Continued)

*Primary Examiner* — Mehmood B. Khan
(74) *Attorney, Agent, or Firm* — Kwan & Olynick LLP

(57) ABSTRACT

Systems and methods to determine a location of a mobile device by combining a radio frequency navigation system and an inertial navigation system, where the radio frequency navigation system determines a location of the mobile device in reference to a map of radio frequency signals and the inertial navigation system based on dead reckoning the position of the mobile device based on measurements from motion sensors. When a set of successive locations determined by the radio frequency navigation system is found to have a predetermined pattern (e.g., within a minimum distance from each other, or separated by more than a maximum distance), the mobile device discards the location results from the radio frequency navigation system for the period of time, in favor of the location results from the inertial navigation system.

18 Claims, 10 Drawing Sheets

Related U.S. Application Data filed on Oct. 14, 2016, provisional application No. 62/408,265, filed on Oct. 14, 2016.

(51) Int. Cl.

| | | |
|---|---|---|
| *H04B 17/318* | (2015.01) | |
| *G01C 21/18* | (2006.01) | |
| *G01C 21/20* | (2006.01) | |
| *G01S 5/02* | (2010.01) | |
| *H04W 4/80* | (2018.01) | |
| *G01S 5/14* | (2006.01) | |
| *H04W 4/04* | (2009.01) | |
| *H04W 84/04* | (2009.01) | |
| *H04W 84/12* | (2009.01) | |
| *H04W 88/02* | (2009.01) | |
| *H04W 88/08* | (2009.01) | |

(52) U.S. Cl.
CPC .............. *G01S 5/0252* (2013.01); *G01S 5/14* (2013.01); *H04B 17/318* (2015.01); *H04W 4/023* (2013.01); *H04W 4/026* (2013.01); *H04W 4/027* (2013.01); *H04W 4/043* (2013.01); *H04W 4/80* (2018.02); *H04W 64/00* (2013.01); *H04W 64/006* (2013.01); *H04W 84/042* (2013.01); *H04W 84/12* (2013.01); *H04W 88/02* (2013.01); *H04W 88/08* (2013.01)

(58) Field of Classification Search
CPC . H04W 64/006; H04W 84/042; H04W 84/12; H04W 88/02; H04W 88/08; H04W 4/043; H04B 17/318; G01S 5/0252; G01S 5/14
See application file for complete search history.

(56) References Cited

U.S. PATENT DOCUMENTS

| | | | | |
|---|---|---|---|---|
| 8,994,591 | B2* | 3/2015 | Dupray | G01C 21/206 342/457 |
| 9,104,886 | B1* | 8/2015 | Dolbakian | G06F 21/62 |
| 9,204,257 | B1 | 12/2015 | Mendelson | |
| 9,638,784 | B2* | 5/2017 | Patel | G01S 5/0289 |
| 2002/0198656 | A1 | 12/2002 | Ford et al. | |
| 2007/0150444 | A1* | 6/2007 | Chesnais | H04W 4/02 |
| 2007/0247366 | A1 | 10/2007 | Smith et al. | |
| 2009/0156241 | A1* | 6/2009 | Staffaroni | G06Q 10/06311 455/466 |
| 2010/0020776 | A1* | 1/2010 | Youssef | H04W 64/00 370/338 |
| 2010/0109842 | A1* | 5/2010 | Patel | G01C 21/206 340/10.1 |
| 2010/0127919 | A1* | 5/2010 | Curran | G01S 19/40 340/573.4 |
| 2010/0127935 | A1* | 5/2010 | Huang | G01S 1/68 342/463 |
| 2010/0134356 | A1* | 6/2010 | Huang | G01S 5/0252 342/464 |
| 2011/0117924 | A1* | 5/2011 | Brunner | G01S 5/0252 455/456.1 |
| 2011/0176494 | A1* | 7/2011 | Huang | G01S 5/02 370/329 |
| 2011/0250904 | A1* | 10/2011 | Valletta | G01S 5/0252 455/456.1 |
| 2012/0087212 | A1 | 4/2012 | Vartanian et al. | |
| 2012/0173139 | A1 | 7/2012 | Judd et al. | |
| 2012/0226467 | A1 | 9/2012 | Miller et al. | |
| 2013/0131973 | A1* | 5/2013 | Friedler | G01C 21/20 701/409 |
| 2013/0162481 | A1* | 6/2013 | Parvizi | G01S 3/023 342/452 |
| 2013/0165144 | A1* | 6/2013 | Ziskind | H04W 4/02 455/456.1 |
| 2014/0222573 | A1 | 8/2014 | Middleton et al. | |
| 2014/0222685 | A1 | 8/2014 | Middleton et al. | |
| 2014/0226864 | A1* | 8/2014 | Venkatraman | G01C 21/20 382/107 |
| 2014/0308976 | A1 | 10/2014 | Garin et al. | |
| 2015/0005014 | A1* | 1/2015 | Huang | G01S 5/0263 455/456.5 |
| 2015/0057016 | A1 | 2/2015 | Moshfeghi | |
| 2015/0153151 | A1* | 6/2015 | Kochanski | G01B 7/004 702/150 |
| 2015/0230058 | A1* | 8/2015 | Cho | H04W 4/025 455/456.1 |
| 2015/0271641 | A1 | 9/2015 | Sung | |
| 2015/0346313 | A1* | 12/2015 | Smith | G01S 5/0252 342/465 |
| 2015/0346317 | A1* | 12/2015 | Patel | G01S 5/0289 455/456.1 |
| 2016/0047890 | A1* | 2/2016 | Ryan | G01S 5/16 398/118 |
| 2016/0150362 | A1* | 5/2016 | Shaprio | H04W 4/02 340/539.13 |
| 2016/0227367 | A1* | 8/2016 | Alsehly | H04W 4/021 |
| 2016/0238690 | A1* | 8/2016 | Colucci | G01S 1/68 |
| 2017/0006419 | A1* | 1/2017 | Rajala | H04W 4/021 |
| 2017/0013409 | A1 | 1/2017 | Cerchio et al. | |
| 2018/0106618 | A1 | 4/2018 | Cerchio et al. | |
| 2018/0109910 | A1 | 4/2018 | Cerchio et al. | |

FOREIGN PATENT DOCUMENTS

| | | | | |
|---|---|---|---|---|
| WO | WO-2015049660 A1 * | 4/2015 | | G01S 1/68 |
| WO | 2018071782 A1 | 4/2018 | | |
| WO | 2018071782 A3 | 5/2018 | | |

OTHER PUBLICATIONS

"U.S. Appl. No. 15/374,799, Examiner Interview Summary dated Nov. 28, 2017", 3 pgs.
"U.S. Appl. No. 15/374,799, Non Final Office Action dated Aug. 25, 2017", 18 pgs.
"U.S. Appl. No. 15/374,799, Final Office Action dated Mar. 8, 2018", 7 pages.
"U.S. Appl. No. 15/374,833, Non Final Office Action dated Jun. 1, 2018", 17 pgs.
"Int'l Application Serial No. PCT/US17/56535, Int'l Search Report and Written Opinion dated May 2, 2018", 16 pgs.

* cited by examiner

SYSTEMS AND METHODS TO DETERMINE A LOCATION OF A MOBILE DEVICE

RELATED APPLICATIONS

The present application claims the benefit of the filing dates of Prov. U.S. Pat. App. Ser. No. 62/408,264, filed Oct. 14, 2016 and entitled "Systems and Methods to Determine a Location of a Mobile Device", Prov. U.S. Pat. App. Ser. No. 62/408,261, filed Oct. 14, 2016 and entitled "Systems and Methods to Determine a Location of a Mobile Device", and Prov. U.S. Pat. App. Ser. No. 62/408,265, filed Oct. 14, 2016 and entitled "Systems and Methods to Determine a Location of a Mobile Device", the entire disclosures of which applications are hereby incorporated herein by reference.

The present application relates to U.S. patent application Ser. No. 15/193,377, filed Jun. 27, 2016, which claims the benefit of the filing dates of: Prov. U.S. Pat. App. Ser. No. 62/190,690, filed Jul. 9, 2015, and Prov. U.S. Pat. App. Ser. No. 62/192,795, filed Jul. 15, 2015, the entire disclosures of which applications are hereby incorporated herein by reference.

FIELD OF THE TECHNOLOGY

At least some embodiments of the present disclosure relate to position determination systems in general and more particularly but not limited to the determination of a position of a mobile device using beacon devices that transmit wireless signals.

BACKGROUND

U.S. Pat. No. 8,179,816 discloses an indoor positioning system using a narrowband radio frequency transceiver and discussed a number of other indoor positioning systems. For example, some systems use power-of-arrival (PoA) from a set access points in accordance with IEEE 802.11 for wireless local area networks to determine the location of a mobile device. For example, some systems use Time-of-flight (ToF) of signals from or to satellites or base-stations to convert the arrival time to distances in view of the propagation speed of signals.

U.S. Pat. App. Pub. No. 2012/0226467 discloses an inertial navigation unit that utilizes multiple accelerometers to gather specific force data for improvement of the initialization, navigation, assistance, or corrective processes.

U.S. Pat. App. Pub. No. 2002/0198656 discloses an Inertial GPS navigation system that has a GPS sub-system and an inertial sub-system. If the receiver loses GPS satellite signals, the receiver utilizes the inertial position, velocity and covariance information to speed up GPS satellite signal re-acquisition and associated ambiguity resolution operations.

U.S. Pat. App. Pub. No. 2012/0173139 discloses the use of magnetic fingerprint of locations to estimate the position of a navigation device.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one embodiment, a system is configured to provide improved position determination results by distributing beacon devices at pedestrian traffic "choke points", such as door entrances, elevator entrances and tops and bottoms of escalators, to obtain a very precise position of the mobile device based on the radio frequency power measurement of the beacon devices positioned at these choke points. The results can be used to correct the positions of the mobile device determined using other technologies, such as providing an initial position to be used by an inertial navigation system to track the location of the mobile device, correcting the drift in the tracked location provided by the inertial navigation system, imprecision of Wi-Fi and beacon fingerprinting, and/or providing a much more accurate and robust positioning method.

Figure 1:
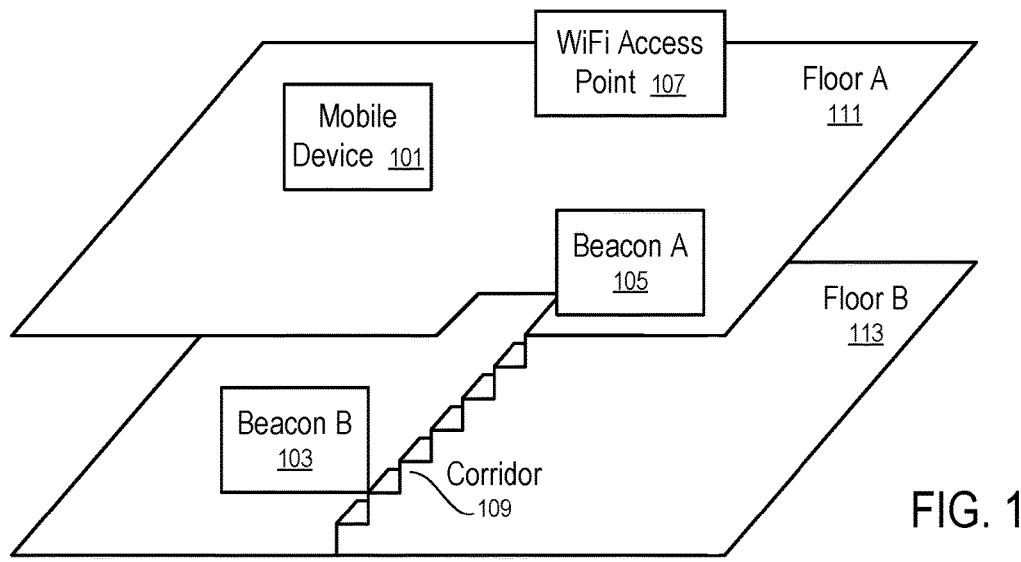
FIG. 1 shows a system configured to determine a position of a mobile device in an indoor environment according to one embodiment.

FIG. 1 shows a system configured to determine a position of a mobile device in an indoor environment according to one embodiment. For example, the system of FIG. 1 can be used to improve position determination results by distributing beacon devices at pedestrian traffic "choke points" as discussed above.

In FIG. 1, the position of the mobile device (101) in a multi-floor indoor environment is determined and/or tracked via the use of beacons (103 and 105) disposed at selected locations of a transport corridor (109), such as the top and bottom of an escalator or a stairway, the entrances of an elevator connecting between the floors (111 and 113), etc.

In FIG. 1, the direction of the location of one beacon B (103) to the location of another beacon A (105) corresponds to the direction of traffic flow on the corridor (109). The transport corridor (109) substantially confines the possible locations of the mobile device (101) on one or more predefined line segments identified by the locations of the beacons (103, 105), if the mobile device (101) is determined to be in the traffic on the corridor (109). Thus, detecting the mobile device (101) being in the traffic simplifies the position determination of the mobile device (101) and improves the accuracy of the determined position.

In FIG. 1, the mobile device (101) is configured to receive signals from the beacons (103 and 105) and monitor the signal strength of the received beacon signals. When the mobile device (101) moves past a beacon (e.g., 105), the strength of the signal received from the beacon (105) reaches a peak and then drops off from the peak. The time instance at which the beacon signal reaches the peak corresponds to the moment where the mobile device (101) is the closest to the location of the beacon (105).

In general, the mobile device (101) may move close to the beacon (105) and then move away from the beacon (105), causing the mobile device (101) to detect a peak in beacon signal, without actually moving to the location of the beacon (105).

When the mobile device (101) detects that a peak in signal strength from the beacon A (105) and then a peak in signal strength from the beacon B (103), the mobile device (101) determines that the movement of the mobile device (101) is consistent with the traffic flow in the transport corridor (109).

Furthermore, the time gap between the peak in signal strength from the beacon A (105) and the peak in signal strength from the beacon B (103) is determined to be the travel time from the vicinity of beacon A (105) to the vicinity of beacon B (103). The time gap can be compared with the time gap of expected traffic flowing through the transport corridor (109). If the time gaps match with each other, the determination of the mobile device (101) moving along the corridor (109) during the time period between the signal peaks can be confirmed. Thus, a location of the mobile device determined using another location determination system can be corrected and/or improved based on the timing of the mobile device traveling in the traffic flow; alternatively or in combination, the position of the mobile device determined in connection with the traffic flow can be used as an initial position of the mobile device in subsequent tracking of the position of the mobile device.

For example, when the corridor (109) is an escalator, the expected traffic flow can be determined based on the speed of the escalator. For example, when the corridor (109) is an elevator, the expected traffic flow can be determined from the speed of the elevator. For example, when the corridor (109) is a stairway, an average traffic flow speed can be measured for the stairway to determine a typical time gap for traveling from the vicinity of the beacon A (105) to the vicinity of the beacon B (103).

When the time gap between the peak in signal strength from the beacon A (105) and the peak in signal strength from the beacon B (103) is consistent with the expected traffic flowing through the transport corridor (109), the mobile device (101) is determined to have traveled between the locations of the beacon A (105) and the beacon B (103). Thus, the travel speed and position of the mobile device (101) during the time period between the peaks in beacon signal strength are determined in relation with the known path of the corridor (109) with great precision.

The determined position and the travel speed of the mobile device based on the beacons in connection with the information of the traffic flow can be used to augment the performance of other indoor positioning systems.

For example, in one embodiment, the mobile device (101) further includes an inertial guidance system that uses motion sensors, such as accelerometers and gyroscopes, to calculate, via dead reckoning, the position, orientation, and velocity (including the direction and speed of movement) of the mobile device (101). For example, the acceleration over a period of time provides the change in the speed of the mobile device (101); and the speed of the mobile device (101) over a period of time provides the change in the position of the mobile device (101).

The determined position and travel speed of the mobile device (101) on the corridor (109) can be used to provide an initial position and/or the speed for the inertial guidance system to determine, using the measurements from the motion sensors, the subsequent location and spend of the mobile device (101) after the mobile device moves away from the corridor (109).

For example, when the mobile device (101) moves to the next corridor (109), or travels back via the corridor (109), the determined position and travel speed of the mobile device (101) in the corridor (109) can be used to reset the position and/or the speed of the mobile device (101) for subsequent location tracking via the inertial guidance system. Thus, each time the mobile device (101) moves through a corridor (109) with the correspondingly equipped beacon sets (103 and 105), the mobile device (101) can reinitialize the inertial guidance system to correct drift in the results provided by the inertial guidance system.

When the corridor (109) is an elevator, a signal beacon (105) may be installed inside the elevator. When the mobile device (101) enters the elevator, the beacon signal strength reaches a highest level and stay at the level during the time period of the elevator traveling from one floor (113) to another floor (111). When the mobile device leaves the elevator, the beacon signal strength drops off from the highest level. Thus, from correlating the timing of the beacon signal strength reaching the highest level and dropping off from the highest level with the time of the travel of the elevator, the speed and position of the mobile device (101) within the elevator can be determined with great accuracy. The floor position of the elevator can be used to accurately identify the position of the elevator. Optionally, the beacon signal may include the data reporting the floor position of the elevator and/or location coordinates of the beacon, which data can be used in the mobile device (101) to determine the location and travel speed of the mobile device (101) for the time period in the elevator. Alternatively, multiple beacons (105, 103) can be placed at the exit locations of the elevator in a way similar to beacons being placed on or near an escalator or stairway to provide the beacon location and/or identity information.

The mobile device (101) may optionally include a radio frequency fingerprint-based location determination system. When the mobile device (101) has a radio frequency fingerprint-based location determination system, the beacon signals can be used to improve the location determination results of the radio frequency fingerprint-based location determination system. For example, a distribution of radio frequency fingerprints of the indoor environment can be obtained via a survey operation. Different locations inside the multi-floor environment generally have different radio frequency fingerprints and different relations with neighboring locations. Thus, when the mobile device (101) moves around the environment and measures the radio frequency fingerprints, the measured radio frequency fingerprints can be correlated with the predetermined distribution of radio frequency fingerprints to determine a location of the mobile device (101).

However, in certain environments, different floors may have similar distribution of radio frequency fingerprints. Thus, the radio frequency fingerprint-based location determination system may have difficulties in determine accurately the floor on which the mobile device (101) is currently located. The determination of the mobile device (101) moving through the corridor (109) provides the accurate information about the floor on which the mobile device (101) is currently located and thus, allows the radio frequency fingerprint-based location determination system to correlate the measured radio frequency fingerprints with the distribution of the correct floor to provide accurate results with reduced correlation time.

When the mobile device (101) is equipped with multiple positioning systems, the mobile device (101) is configured to combine the results from the multiple positioning systems to provide an improved overall estimate of the position of the mobile device (101).

For example, when the mobile device (101) travels through the corridor (109), the accurate position and speed of the mobile device (101) can be used to provide the initial position and speed of the mobile device (101) for the inertial guidance system that uses the measurement of the motion sensors to updated the subsequent location and speed of the mobile device (101). After a period of time, the drift in the inertial guidance system may lead to increased errors in the determined location and speed of the mobile device (101). Thus, after a threshold period of time, if the inertial guidance system cannot be reset via the positioning results from traveling through a corridor equipped with the beacons (103, 105), the mobile device (101) may use the location results from the radio frequency fingerprint-based location determination system.

The accuracy of the results from the radio frequency fingerprint-based location determination system are associated with the locations calculated by matching the measured radio frequency fingerprints with the predetermined distribution of radio frequency fingerprints; and the accuracy of the results from the inertial guidance system are determined from the lapsed time from the initialization using an accurate result from the beacons (103, 105) installed near the corridor (109). The mobile device (101) combines the results from the radio frequency fingerprint-based location determination system and the inertial guidance system based on the accuracy estimates of the respective results. For example, when the result of the radio frequency fingerprint-based location determination system is more than a threshold better than the result of the inertial guidance system, the result from the inertial guidance system is discarded; when the result of the radio frequency fingerprint-based location determination system is more than a threshold worse than the result of the inertial guidance system, the result from the radio frequency fingerprint-based location determination system is discarded; and otherwise, the result of the radio frequency fingerprint-based location determination system and the result of the inertial guidance system are combined (e.g., via an weighted average, where the weights for the results from the different systems are proportional to the estimated accuracy of the respective results).

The mobile device (101) (or a remote server in communication with the mobile device (101)) is configured to remove and/or reduce the flaws of the individual measuring system (e.g., the inertial guidance system, the radio frequency fingerprint-based location determination system, and the choke-point-beacon-based system) by examining in real time the data of each individual system, using the known propensity of the types of errors that one system produces and the real time data produced by another system to eliminate the types of errors.

As an example, a radio frequency fingerprint-based location determination system has the propensity to report jumps in the position of the mobile device. The person may or may not be actually turning to the jump location. An inertial system does not report positions with this type of positioning errors. Therefore, when a jump signature is recognized in the reported positioning results of a radio frequency fingerprint-based location determination system, a solution integration engine, implemented in the mobile device (101) or a remote server in communication with the mobile device (101), is configured to eliminate the faulty position provided by the radio frequency fingerprint-based location determination system and utilizing the position determined by the inertial guidance system.

A typical inertial guidance system has a tendency to drift, which is recognized by the solution integration engine. Once a series of high quality positions has been received which have not had any recognized error artifact and the inertial system is exhibiting its drift tendency away from those high quality positions determined by the radio frequency fingerprint-based location determination system, the inertial system can be reset/initialized according to the positions determined by the radio frequency fingerprint-based location determination system, and/or creating a composite heading figure using the data from both systems.

Thus, the present disclosure provides a plurality of position correction techniques and system calibration techniques based on the known error signatures and tendencies of individual positioning systems used by the mobile device (or a remote server) and/or beacon signals associated with known locations and known traffic speed.

Figure 2:
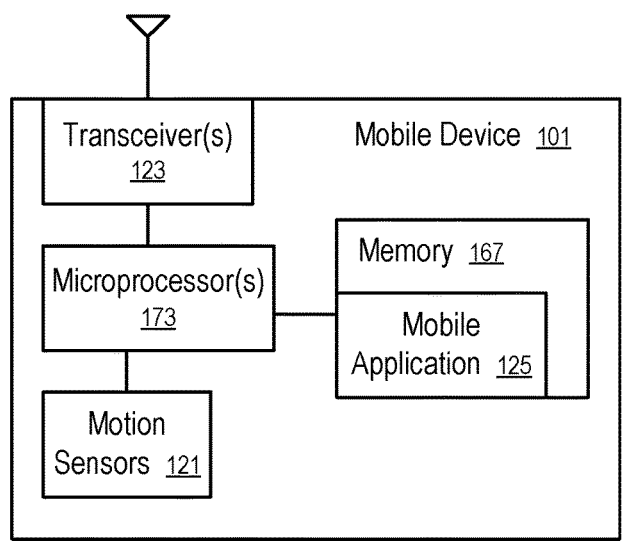
FIG. 2 shows a mobile device for its location determination according to one embodiment.

FIG. 2 shows a mobile device for its location determination according to one embodiment. For example, the mobile device (101) of FIG. 2 can be used in the system of FIG. 1. In FIG. 2, the mobile device (101) includes one or more transceivers (123) to receive signals from the beacons (103, 105) to detect the peaks of their signals corresponding to the travel of the mobile device (101) between the locations of the beacons.

Optionally, one or more transceivers (123) are further used to communicate with the Wi-Fi access points (e.g., 107) in the environment to support radio frequency fingerprint-based location estimation.

In FIG. 2, the mobile device (101) further includes motion sensors (121), such as accelerometers and gyroscopes to support inertial guidance based location estimation.

The mobile device (101) includes memory (167) storing a mobile application (125) having instructions configured to instruct one or more microprocessor(s) (173) to receive measurement results from the transceiver(s) (123) and the motion sensors (121), and determine the position of the mobile device (101) in a way as discussed above in connection with FIG. 1.

The memory (167) may optionally store data such as the distribution of radio frequency fingerprints in the indoor environment, the locations of beacons (103, 105), etc. Alternatively or in combination, the mobile device (101) communicates with a remote server to obtain such data (e.g., when such data is needed, or for storing in the memory (167) after the mobile device (101) enters the indoor environment as illustrated in FIG. 1).

Optionally, the beacons (103 and 105) broadcast not only their identities, but also related data, such as the location of the beacons (130 and 105), the expected travel speed of the corridor (109), etc. When such data is not included in the beacon signals, the mobile device (101) may look up such data from the memory (167) or query the remote server.

In the above discussion, the peak beacon signal strength is determined by the mobile device (101) receiving the beacon signals from the beacons (103, 105). Alternatively, the mobile device (101) may transmit the beacon signals to the corresponding beacons (103, 105), which are connected to a centralized remote server to compute the location of the mobile device (101). Similarly, the mobile device (101) may provide the radio frequency fingerprint measurements to the server for a determination of the location of the mobile device (101). Thus, the position calculations can be performed at least in part on the remote server.

Figure 3:
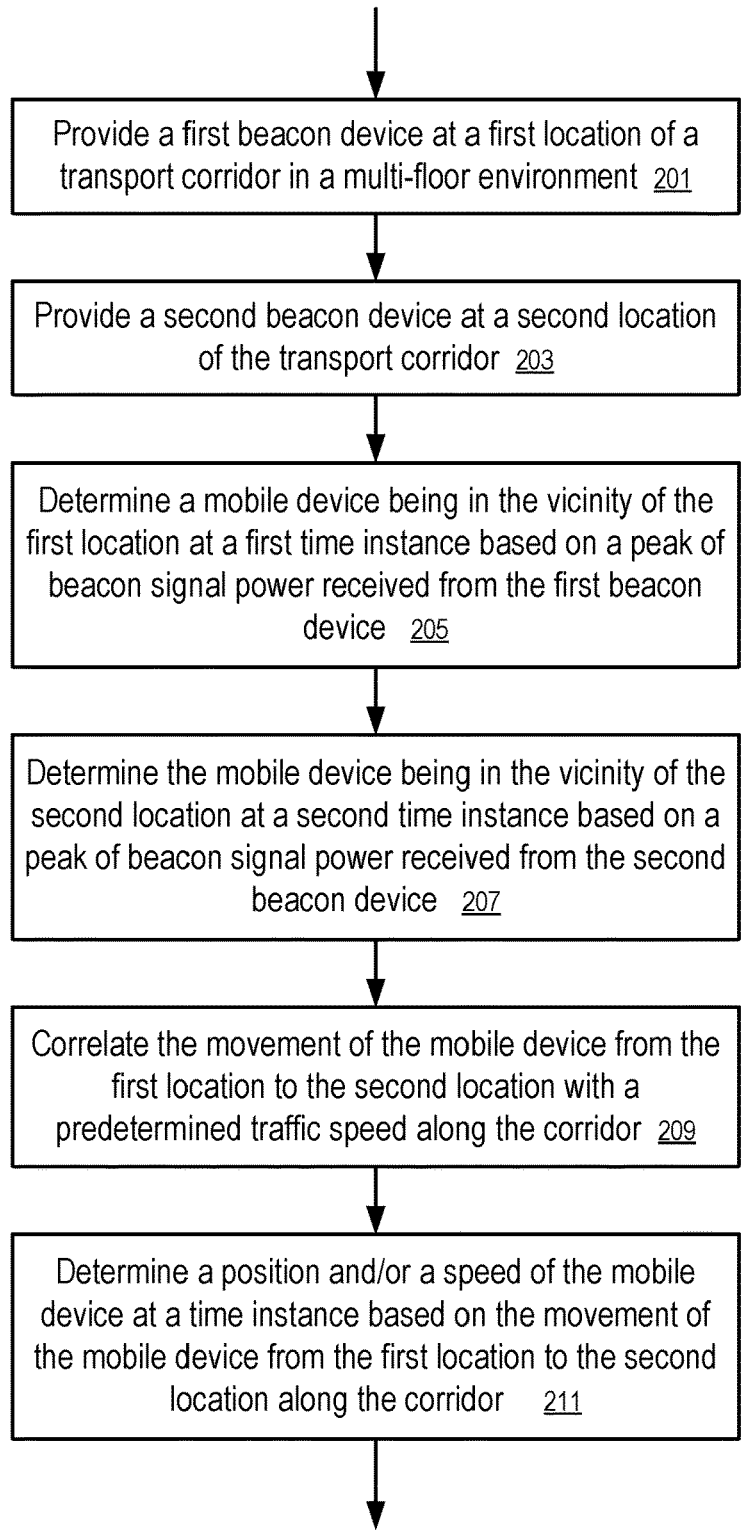
FIG. 3 shows a method to determine a location of a mobile device according to one embodiment.

FIG. 3 shows a method to determine a location of a mobile device according to one embodiment. The method of FIG. 3 can be implemented in the system of FIG. 1 using a mobile device (101) illustrated in FIG. 2.

In FIG. 3, the mobile device (101) is configured to: provide (201) a first beacon device at a first location of a transport corridor in a multi-floor environment; provide (203) a second beacon device at a second location of the transport corridor; determine (205) the mobile device being in the vicinity of the first location at a first time instance based on a peak of beacon signal power received from the first beacon device; determine (207) the mobile device being in the vicinity of the second location at a second time instance based on a peak of beacon signal power received from the second beacon device; correlate (209) the movement of the mobile device from the first location to the second location with a predetermined traffic speed along the corridor; and determine a position and/or (211) a speed of the mobile device at a time instance based on the movement of the mobile device from the first location to the second location along the corridor.

A method in the present disclosure includes: providing a first beacon device (103) at a first location of a transport corridor in a multi-floor environment; and providing a second beacon device (105) at a second location of the transport corridor (e.g., as illustrated in FIG. 1). After a mobile device (101) is determined to be at the first location at a first time instance based on a peak of beacon signal power from the first beacon device and at the second location at a second time instance based on a peak of beacon signal power from the second beacon device, the movement of the mobile device from the first location to the second location is correlated with a predetermined traffic speed along the corridor. The position and speed of the mobile device (101) at a time instance (e.g., between the first time instance and the second time instance) are determined based on the movement of the mobile device from the first location to the second location along the corridor, if the movement is consistent with predetermined traffic speed. Examples of the transport corridor include: a stairway, an escalator, an elevator, and a pathway or walkway having an entrance and an exit.

For example, based on the position and speed of the mobile device, an initial position and an initial speed used in an inertial guidance system of the mobile device can be calibrated, where the mobile device uses motion sensors to measure acceleration and rotation of the mobile device to track a current location of the mobile device from the initial position and the initial speed. For example, the position and speed of the mobile device determined from the movement of the mobile device in the corridor can be used as the initial position and the initial speed.

For example, the position of the mobile device can be used to improve a position determination result from a radio frequency fingerprint-based location determination system of the mobile device, where the mobile device measures a radio frequency fingerprint and determines a location of the mobile device based on correlation the radio frequency fingerprint with a predetermined distribution of radio frequency fingerprints in the multi-floor environment. For example, the position of the mobile device determined from the movement of the mobile device in the corridor can be used to select a floor from a plurality of floors in the multi-floor environment (e.g., to limit the correlation to the particular selected floor and/or prevent floor-jumping in the correlation).

Another method in the present disclosure includes: measuring, by a mobile device (101), a radio frequency fingerprint; correlating the radio frequency fingerprint to a predetermined distribution of radio frequency fingerprints in a multi-floor environment to determine a first location determination result; measuring, by the mobile device (101), accelerations of the mobile device as a function of time; determining a second location determination result based on the accelerations (e.g., via a time integration of the accelerations); receiving, in the mobile device, a first beacon signal from a beacon device (103) disposed at a first location of a transport corridor in the multi-floor environment; determining a first location of the beacon device (103) based on the first beacon signal; and computing a location of the mobile device (101) based on the first location of the beacon device, the first location determination result, and the second location determination result.

For example, after receiving in the mobile device (101), a second beacon signal from the beacon device, a second location of the beacon device can be determined based on the second beacon signal, where the location of the mobile device can be computed further based on the second location of the beacon device. For example, the beacon device may be disposed on a transport corridor in the form of an escalator or an elevator, where the beacon device travels with the escalator or elevator to transport the user who is carrying the mobile device (101). For example, a speed of the mobile device can be determined based on the first location and the second location of the beacon device; and the second location determination result can be determined based at least in part on the speed of the mobile device and a time integration of the accelerations. In some implementations, the first beacon signal identifies the first location of the beacon device; and the second beacon signal identifies the second location of the beacon device. In other implementations, the identifier(s) of the beacon(s) and/or the times of the beacon signals can be used to look up the beacon locations from a remoter server. Further, the beacon location can be used to select a floor in the first location determination result determined from radio frequency fingerprint correlation.

In another example, the mobile device receives the second beacon signal from a second beacon device (105) to determine the second location. Then, a speed of the mobile device (101) can be based on the first location of the first beacon device (103) and the second location of the second beacon device (105) that are located on different part of the transport corridor, such as a stairway, a pathway or walkway having an entrance and an exit, an escalator, an elevator, etc. The speed can be used as a basis from which time integration of accelerations can be used to track the subsequent locations of the mobile device (101) based on the measurement of the motion sensors.

A further method of the present disclosure includes: measuring, using at least one transceiver (123) of a mobile device (101), a radio frequency fingerprint; determining a first location determination result based on correlating the radio frequency fingerprint to a predetermined distribution of radio frequency fingerprints in a multi-floor environment; measuring, using a motion sensor (121) of the mobile device (101), accelerations of the mobile device as a function of time; determining a second location determination result based on the accelerations; and computing a location of the mobile device by combining the first location determination result and the second location determination result.

For example, after estimating an accuracy of the first location result and an accuracy of the second location result, the mobile device (101) (or a remote server in communication with the mobile device (101)) combines the first location determination result and the second location determination result based on the accuracy of the first location result and the accuracy of the second location result. The combination of the first location determination result and the second location determination result can be in the form of a weighted average of the first location determination result and the second location determination result, where weights of first location determination result and the second location determination result are based on the accuracy of the first location result and the accuracy of the second location result.

Further, the mobile device (101) may optionally receive at least two beacon signals from at least one beacon device (e.g., 103 and/or 105) disposed on a transport corridor in a multi-floor environment to determine at least two beacon positions corresponding to the at least two beacon signals. A position and a speed of the mobile device (101) on the transport corridor are estimated based on the at least two beacon positions and used in the computation of the location of the mobile device.

For example, the position and the speed of the mobile device (101) on the transport corridor estimated based on the at least two beacon positions can be used as an initial solution to time integrate accelerations measured by the motion sensor and track the location of the mobile device. Further, the position the mobile device on the transport corridor estimated based on the at least two beacon positions can be used to identify a floor in a multi-floor environment and thus limit the areas of correlation of radio frequency fingerprints.

The present disclosure includes a non-transitory computer storage medium storing instructions configured to instruct a computing apparatus to perform various methods discussed above and computing apparatuses having at least: a motion sensor; at least one transceiver; at least one microprocessor; and a memory storing instructions configured to instruct the at least one microprocessor and the at least one transceiver to perform any of the methods.

The systems and methods discussed above use fewer beacons to be deployed, relative to a solution not employing this method, to achieve continuous, high-accuracy positioning results. Results of the systems and method are generally more accurate than the results of a radio frequency fingerprint-based location estimate or an inertial guidance location estimate.

Precise positioning (defined here as within 1-2 meters 90% of the time) has yet to be reliably achieved in the prior art. This level of accuracy consistently allows for a vastly improved user experience when navigating a large indoor space such as a shopping center. It allows more precise targeting of communications within the space. For example, assuming the consumer has opted in to receive such messages and/or promotions, with this level of consistent positioning fidelity, a retailer could send a communication or promotion to a specific consumer as she walked by the storefront of the retailer. Such real-time, highly-contextual messaging and promotion is more valuable to advertisers than is general or even "area-based" messaging.

Additionally, there is value for shopping center owners in understanding traffic flows within their centers, in order to 1) promote leasing efforts, and, 2) better understand both individual and aggregate shopper behavior (e.g., gaining a precise understanding of who goes where, and how long they spend in each location and in transit) to better merchandise store mix within the center. The solution as described should allow the precision necessary to acquire positioning data with a very small margin of error, unlike many other solutions.

In at least some embodiments, a mobile device is configured to combine location determination results from radio frequency signals and motion sensor signals to improve location determination accuracy.

Figure 5:
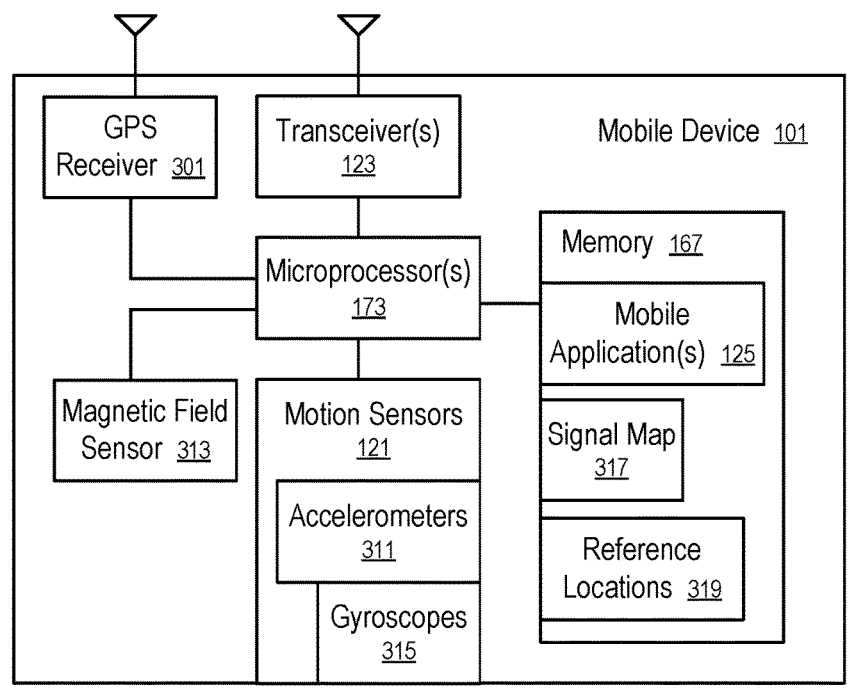
FIG. 5 shows a mobile device for its location determination according to one embodiment.

FIG. 5 shows a mobile device for its location determination according to one embodiment. Various methods discussed in the present application can be implemented in a mobile device (101) illustrated in FIG. 5 (or FIG. 1).

In FIG. 5, the mobile device (101) includes a global positioning system (GPS) receiver (301) configured to receive and process signals from GPS satellites. Alternative satellite positioning systems and corresponding receivers can also be used, such as Galileo positioning system of European Union, BeiDou Navigation Satellite System of China, Quasi-Zenith Satellite System of Japan, and Indian Regional Navigation Satellite System of India. Based on the satellite signals, the mobile device (101) computes the location of the mobile device (101) using satellite positioning techniques currently known in the field. Satellite positioning techniques that may be developed in the future can also be used.

When the mobile device (101) is used in an indoor environment, the poor reception of satellite signals from satellite positioning systems may prevent the satellite positioning system from producing location determination results, or prevent the satellite positioning system from producing accurate location determination results for the mobile device (101).

In one embodiment, when the mobile device (101) detects that its location is approaching or entering a known indoor environment (e.g., based on its current location on a map of known environments, or based on the strength of the satellite positioning signals), the mobile device (101) turns off the operation of the receiver (301) (e.g., to reduce power consumption), and starts one or more mobile applications (125), executing in the microprocessor(s), that determine the location of the mobile device (101) based on alternative signals, such as the signals from the motion sensors (121) and/or the transceivers of radio frequency signals, such as the signals for wireless local area networking (e.g., WiFi signals), signals for wireless personal area networking (e.g., Bluetooth signals), beacon signals, etc.

When the mobile device (101) is primarily designed for use in the indoor environment, the receiver (301) of a satellite positioning system can be omitted.

For example, the motion sensors (121) include accelerometers (311) that measure the accelerations of the mobile device (101) in which the accelerometers (311) are installed. The acceleration measurements as a function of time can be integrated over a time period to determine the change of the velocity of the mobile device (101), which can be further integrated over the time period to determine the change of the position of the mobile device (101).

In an inertial navigation system, motion sensors (121), such as accelerometers (311) and gyroscopes (315), are used to continuously calculate via dead reckoning the position, orientation, and velocity (direction and speed of movement) of a moving object (e.g., the mobile device (101)), without using an external reference system. Through dead reckoning, a previously determined velocity, position, or orientation is updated based on the acceleration, velocity, or spinning of the object to arrive at the currently determined velocity, position, or orientation. Using the measurement data from the motion sensors (121), dead reckoning techniques currently known in the field can be used to update the velocity, position, or orientation of the mobile devices. Dead reckoning techniques that may be developed in the future can also be used.

The orientation of the mobile device (101) can also be determined based on the measurement of magnetic field sensors (313) in reference to the magnetic field of the earth.

In FIG. 5, the mobile device (101) includes not only the inertial navigation system that determines its position based on the measurements of the motion sensors (121), but also a radio frequency navigation system that determines its position in reference to a map (317) of radio frequency signals.

For example, the signal map (317) contains data indicating the radio frequency signal strength of one or more radio frequency sources positioned within an area (e.g., an indoor environment, such as a shopping mall). Examples of the radio frequency sources include access points (107 illustrated in FIG. 1), repeaters, and/or routers for wireless local area network, Bluetooth devices, beacon devices (103, 105 illustrated in FIG. 1), etc. The radio frequency signals received in the transceivers (123) include the identity information of the radio frequency sources. After measuring the signal strengths of the radio frequency signals from one or more sources, a mobile application (125) executed by the microprocessor(s) finds a matched location in the signal map (317) that has radio frequency characteristics (e.g., source identification information and signal strength) that agrees with the measured data.

Thus, the radio frequency navigation system of the mobile device (101) the inertial navigation system of the mobile device (101), and/or the GPS receiver (301) can track the locations of the mobile device (101) substantially independent from each other.

In various methods disclosed in the present application, the confidence levels of the position determination results produced by the different position determination systems of the mobile device (101) are evaluated to combine the results. Further, the high confidence level results from one system are used in another system to improve the overall accuracy of the position determination results from the mobile device (101).

For example, the radio frequency navigation system can produce accuracy results at certain locations but inaccurate results at other locations. The inertial navigation system can produce accurate results within a short time period after an accurate initialization of the initial position and velocity, but inaccuracy accumulates over a long period of time to cause a drift away from accurate results. Thus, when the radio frequency navigation system produces an accurate result, the mobile application(s) (125) can be configured to automatically re-initialize the inertial navigation system using the result from the radio frequency navigation system. Further, the capability of the inertial navigation system in dead reckoning the position of the mobile device (101) for a short period of time allows the mobile application(s) (125) to generate a local distribution of radio frequency signals for improved matching with the signal map (317) in position determination. The position determination results of the radio frequency navigation system can be filtered based on a minimum distance threshold to remove inaccurate position changes (e.g., caused by fluctuation in radio frequency measurements and environment) and/or a maximum distance threshold to remove inaccurate position determination results (e.g., caused by the map (317) containing multiple locations that have similar radio frequency signal characteristics). Further, the pattern of the locations determined by the radio frequency navigation system can be examined for indication of inaccuracy. For example, when the determined locations are within a circle having a radius less than a threshold, the mobile device (101) is considered in a "dwelling" state; and the location determination results from the radio frequency navigation system is then not used to update the location of the mobile device. For example, when the determined locations from the radio frequency navigation system jump from one floor to another floor near the same horizontal location, the radio frequency navigation system produces an inaccurate altitude result (e.g., due to the similarity between the radio frequency signals between the two floors). When the confidence levels of the results of the radio frequency navigation system and the radio frequency navigation system are both within a predetermined range, the results can be combined via an average process weighted according to the confidence levels to update the position of the mobile device (101) (e.g., the higher the confidence level, the heavier the weight in the weighted average process).

Figure 6:
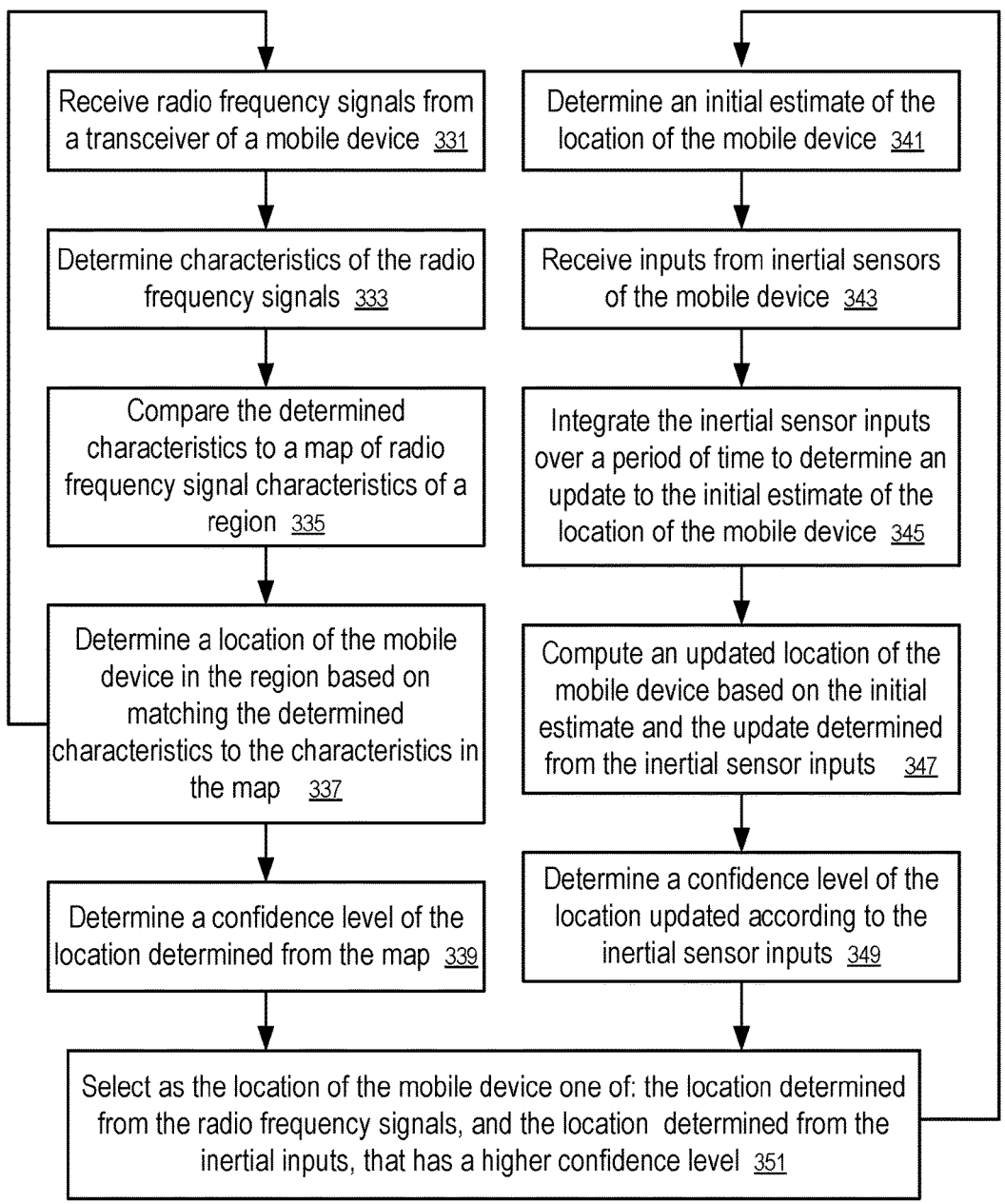
FIG. 6 shows a method to improve an inertial position determination system based on a radio frequency position determination system according to one embodiment.

FIG. 6 shows a method to improve an inertial position determination system based on a radio frequency position determination system according to one embodiment. For example, the method of FIG. 6 can be implemented in the mobile device (101) illustrated in FIG. 2 or 5.

In FIG. 6, the mobile device (101) is configured to use the location determination results from its radio frequency navigation system to re-initiate its inertial navigation system when the radio frequency navigation system produces more accurate results than the inertial navigation system.

The radio frequency navigation system of the mobile device (101) receive (331) radio frequency signals from a transceiver (123) of the mobile device (101) and determines (333) characteristics of the radio frequency signals. The mobile device (101) compares (335) the determined characteristics to a map (317) of radio frequency signal characteristics of a region to determine (337) a location of the mobile device in the region, based on matching the determined characteristics to the characteristics in the map.

After the mobile device (101) determines (341) an initial estimate of the location of the mobile device (e.g., based on a position determination result from the GPS receiver (301), the radio frequency navigation system), the inertial navigation system of the mobile device (101) receives (343) inputs from inertial sensors (e.g., accelerometers (311), gyroscopes (315)) of the mobile device (101) and integrates (345) the inertial sensor inputs over a period of time to determine an update to the initial estimate of the location of the mobile device (101). Based on the initial estimate of the location of the mobile device and the location update determined from the inertial sensor inputs, the mobile device (101) computes (347) (e.g., using a mobile application (125)) an updated location of the mobile device.

The mobile device (101) determines (339) a confidence level of the location determined based on the received radio frequency signals from the signal map (317), and determines (349) a confidence level of the location updated according to the inertial sensor inputs.

For example, the confidence level of the location determined by the radio frequency navigation system of the mobile device (101) depends on the uniqueness level of the determined characteristics of the radio frequency signals in the map (317); and the accuracy of the location determined by the radio frequency navigation system of the mobile device (101) depends on the degree of variation of the characteristics in the vicinity of the determined locations in the map (317) (e.g., the larger the variation, the more accurate is the determined result).

For example, the confidence level of the location determined by the inertial navigation system of the mobile device (101) depends on the accuracy of the initial estimate and the length of the period of time. The longer the length of the time period in which the user is moving, the greater is the drift in the result from the inertial navigation system.

The mobile device (101) selects (351), as the location of the mobile device (101) one of: the location determined from the radio frequency signals by the radio frequency navigation system, and the location determined from the inertial inputs by the inertial navigation system. The location result that has a higher confidence level is selected as the location of the mobile device (101).

In FIG. 6, the selected location result that has a higher confidence level is used (341) as the initial estimate in dead reckoning operations in the inertial navigation system.

Thus, the method as illustrated in FIG. 6 uses the result of the radio frequency navigation system to re-initialize the inertial navigation system, whenever the radio frequency navigation system produces superior results (e.g., at or near locations where the radio frequency navigation system can provide accurate results). When the radio frequency navigation system fails to produce superior results relative to the inertial navigation system, the inertial navigation system provides location determination results (e.g., in regions where the radio frequency navigation system is not able to provide accurate results).

Alternatively, the results of the radio frequency navigation system can be used to periodically re-initiate the inertial navigation system (e.g., at a predetermined time interval, or when the confidence level of the result of the inertial navigation system is below a threshold).

Figure 7:
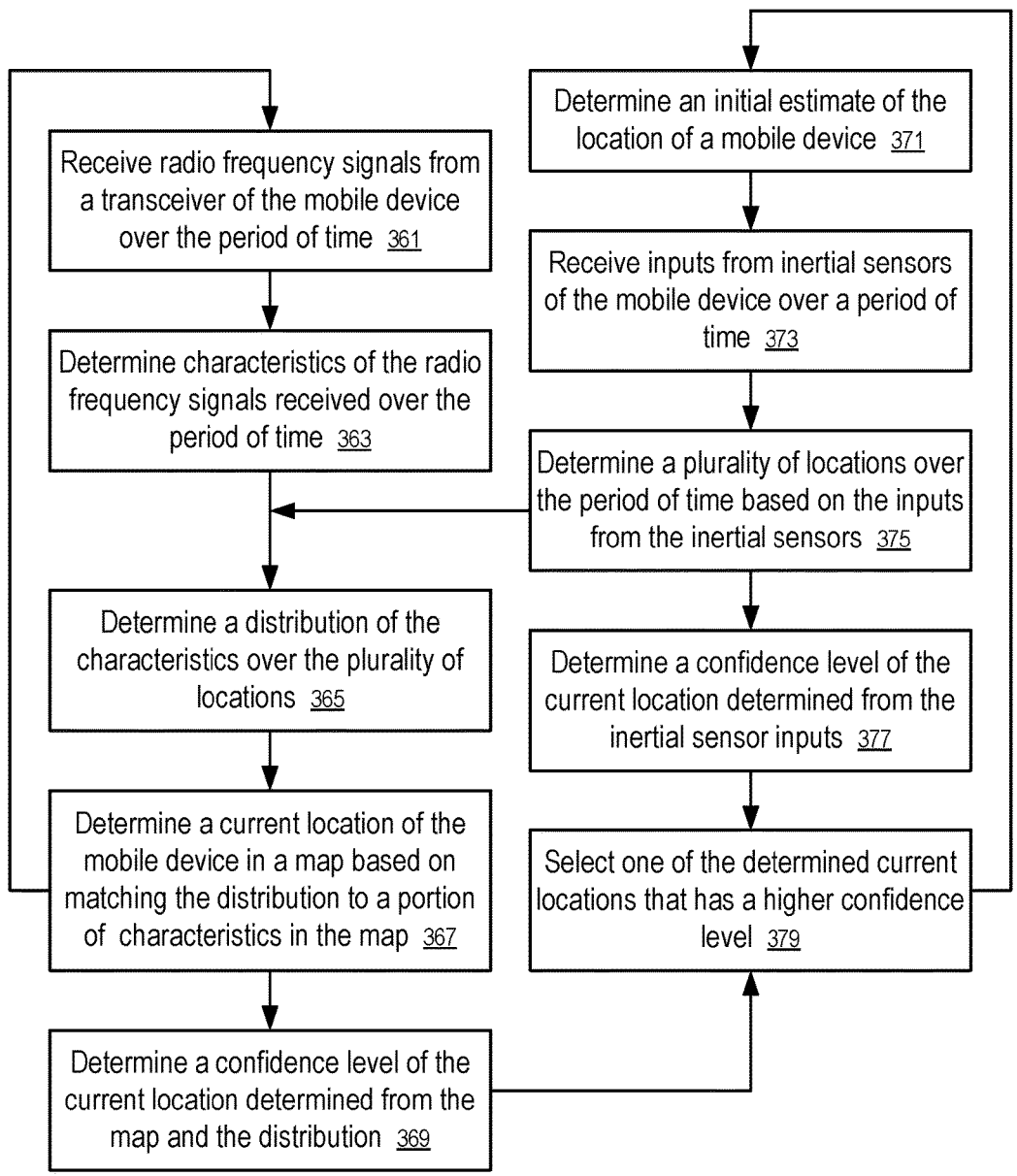
FIG. 7 shows a method to combine an inertial position determination system and a radio frequency position determination system according to one embodiment.

The location determination results of the inertial navigation system can optionally be used to improve the location determination operations of the radio frequency navigation system, as illustrated in FIG. 7.

FIG. 7 shows a method to combine an inertial position determination system and a radio frequency position determination system according to one embodiment. For example, the method of FIG. 7 can be implemented in the mobile device (101) illustrated in FIG. 2 or 5.

In FIG. 7, the inertial position determination system of the mobile device (101) is configured to identify a set of recent locations of the mobile device (101) relative to each other. Since the set of locations are determined to be relative to each other, the accuracy of the determination results is independent from the initial estimate and the length of the lapsed time since the initial estimate. The radio frequency characteristics determined for the set of recent locations form a local distribution of the radio frequency characteristics. By mapping the local distribution to a region in the signal map (317), the radio frequency navigation system can improve its location determination result.

For example, after the mobile device (101) determines (371) an initial estimate of the location of the mobile device (101) and receives (373) input from inertial sensors (e.g., motion sensors (121)) of the mobile device (101) over a period of time, the mobile device (101) determines (375) (e.g., using a mobile application (125)) a plurality of locations of the mobile device (101) over the period of time, based on the inputs from the inertial sensors (e.g., motion sensors (121)). The plurality of locations determined by the inertial navigation system is provided to the radio frequency navigation system of the mobile device to form a local distribution of radio frequency signal characteristics.

For example, after radio frequency signals are received (361) from a transceiver (123) of the mobile device (101) over the period of time, the mobile device (101) determines (363) (e.g., using a mobile application (125)) the characteristics of the radio frequency signals over the period of time. By correlating the time of the determined characteristics and the plurality of locations determined by the inertial navigation system, the mobile device (101) determines (365) a local distribution of the characteristics over the plurality of locations. Based on matching the local distribution to a portion of characteristics in the map (319), the radio frequency navigation system determines (367) a current location of the mobile device in the map (319).

The location determined from mapping the local distribution to a map is typically more accurate than the location determined from mapping the radio frequency characteristics at the current location to the map.

The result of the radio frequency navigation system can be used to re-initialize the inertial navigation system, in a way similar to that discussed in connection with FIG. 6.

For example, after the mobile device (101) determines (377) a confidence level of the current location determined from the inertial sensor input and determines (369) a confidence level of the current location determined from the map and the local distribution, the mobile device selects (379) one of the determined current locations that has a higher confidence level (379). The selected location result can be used to re-initialize (371) the inertial navigation system.

Alternatively, re-initialization of the inertial navigation system can be performed periodically and/or when the confidence level of the location results from the inertial navigation system is below a threshold.

The locations used in the determination of the local distribution of the radio frequency signals can be updated on a continuous basis as more locations are determined from the inertial navigation system; and the updated set of locations for the local region can be used as the basis to construct the updated local distribution for mapping with a portion in the signal map (317).

Figure 8:
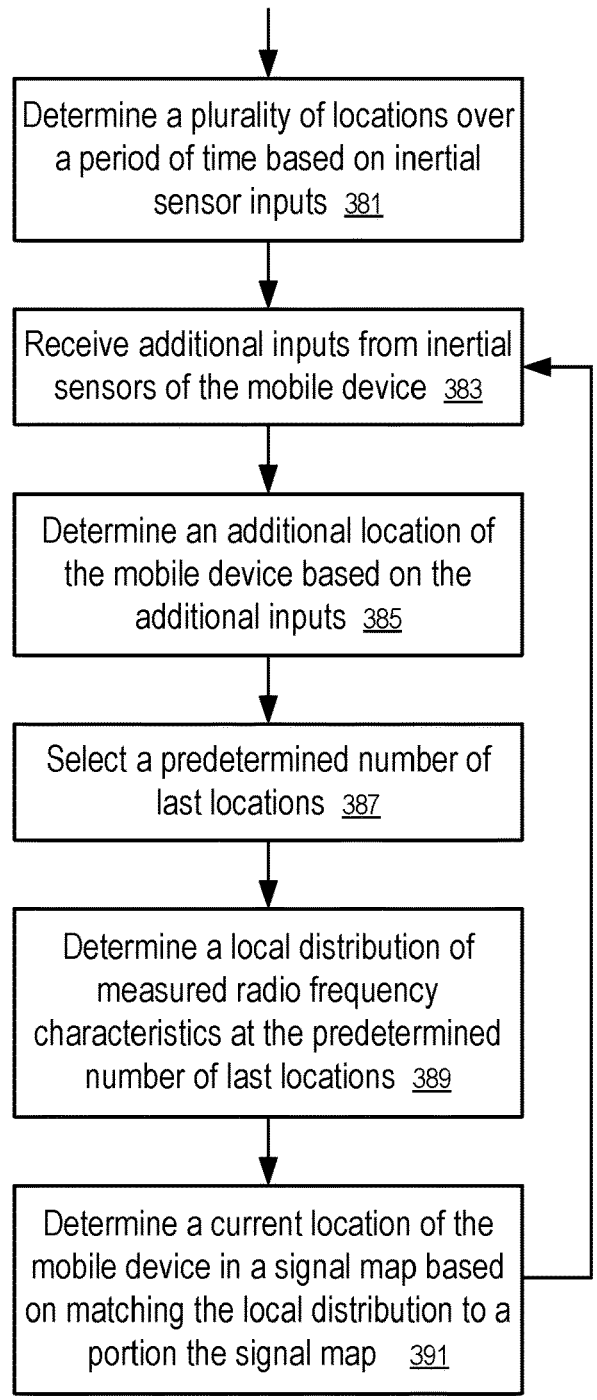
FIG. 8 shows a method to improve a radio frequency position determination system based on an inertial position determination system according to one embodiment.

For example, a predetermined number of locations last determined from the inertial navigation system can be used for the local region for the construction of a measured local distribution, as illustrated in FIG. 8.

FIG. 8 shows a method to improve a radio frequency position determination system based on an inertial position determination system according to one embodiment. For example, the method of FIG. 8 can be implemented in the mobile device (101) illustrated in FIG. 2 or 5.

In FIG. 8, the inertial navigation system of the mobile device determines (381) a plurality of locations over a period of time based on inertial sensor inputs. After receiving (383) additional inputs from inertial sensors (e.g., motion sensors (121)) of the mobile device (101), the inertial navigation system of the mobile device determines an additional location of the mobile device following the period of time, based on the additional inputs from the inertial sensors (e.g., motion sensors (121)). The mobile device (101) selects (387) a predetermined number of last locations and determines (389) a local distribution of measured radio frequency characteristics at the predetermined number of last locations. The radio frequency navigation system then determines (391) a current location of the mobile device (101) in a signal map (317) based on matching the local distribution to a portion of the signal map (317).

When further additional inputs are received (383), a further additional location is determined (385) by the inertial navigation system, which leads to an update for the last locations selected (387) for the determination (389) of the local distribution. The updated local distribution is used by the radio frequency navigation system to determine (391) the updated current location of the mobile device (101).

When the current location of the mobile device (101) determined by the radio frequency navigation system is determined to have a high confidence level, the current location of the mobile device (101) can be used to re-initialize the inertial navigation system, in a way similar to those discussed in connection with FIG. 6 or FIG. 7.

In one embodiment, when the current location of the mobile device (101) determined by the radio frequency navigation system is used to re-initialize the inertial navigation system, the mobile device (101) uses the difference between the current location of the mobile device (101) determined by the radio frequency navigation system and the current location of the mobile device (101) determined by the inertial navigation system to correct the set of predetermined locations used for the local distribution, such that when an additional location determined by the re-initialized inertial navigation system is obtained (383, 385), an additional location can be used with the corrected set of locations to form an updated local distribution.

For example, locations l1, l2, . . . , ln determined for time instances t1, t2, . . . , tn can be used to form a local distribution of signal strength s1, s2, . . . , sn over the locations l1, l2, . . . , ln for matching with the signal map (317). When the matching provides an accurate result of location Ln for the mobile device (101), the mobile device (101) determines the correction of Ln−ln for the location results determined by the inertial navigation system. The correction is added to the locations at time instances t1, t2, . . . , tn to generate corrected locations l1+Ln−ln, l2+Ln−ln, . . . , Ln. When the re-initialized inertial navigation system computes location lm for the next time instance tm, where m=n+1, the local distribution of signal strength s2, . . . , sn, sm over the locations l2+Ln−ln, . . . , Ln, lm can be used for matching with the signal map (317) to update the current location of the mobile device.

Figure 9:
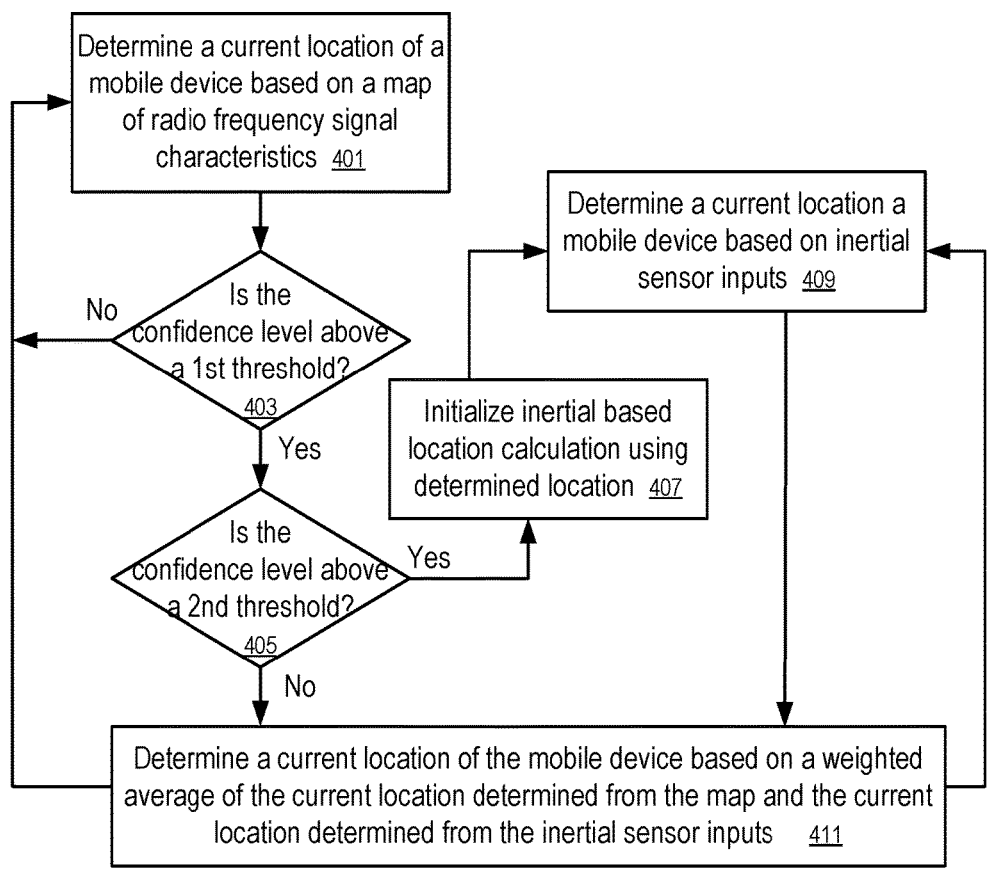
FIG. 9 shows a method to combine the location determination results from an inertial position determination system and a radio frequency position determination system according to one embodiment.
Figure 10:
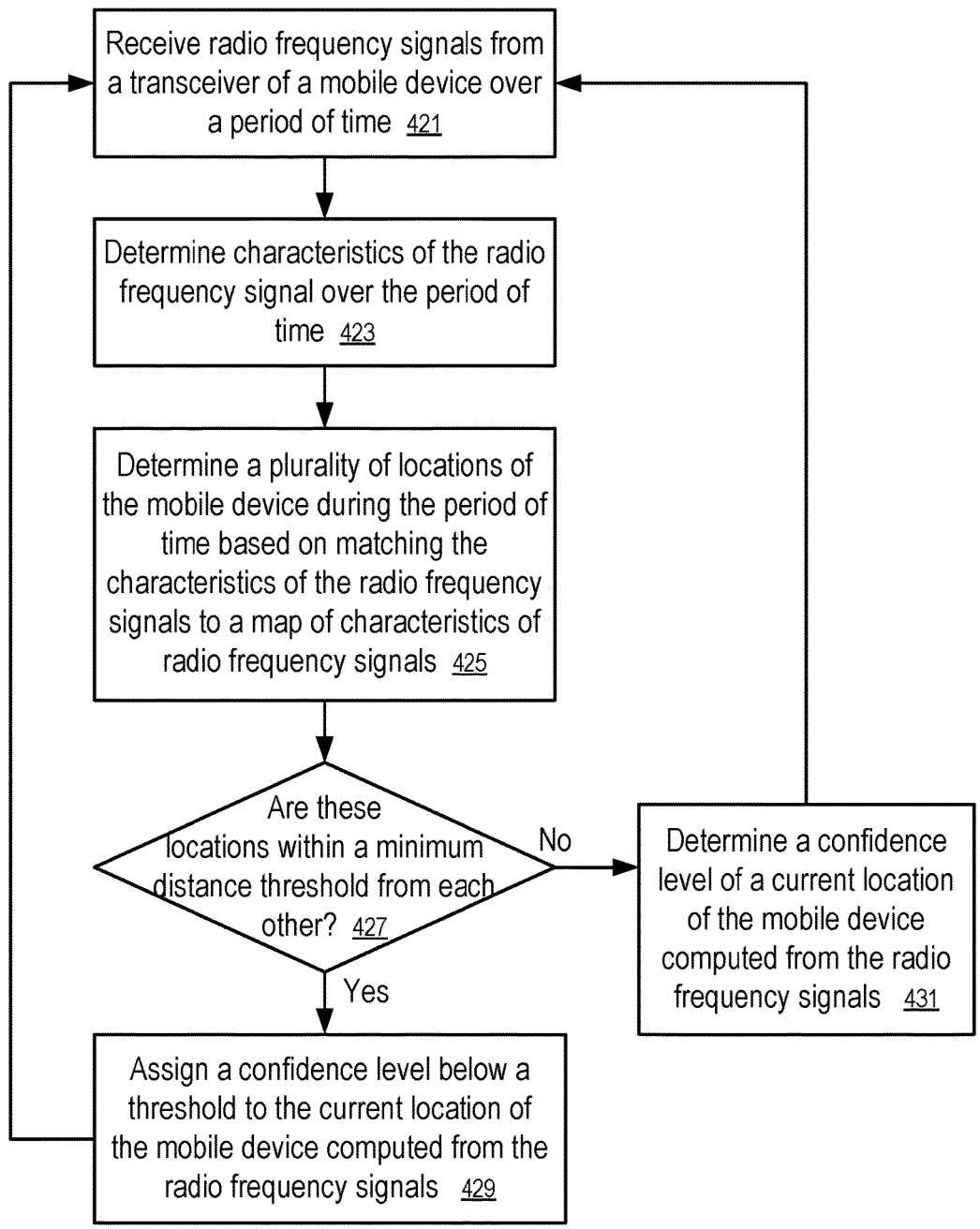
FIG. 10 shows a method to filter the location determination results from a radio frequency position determination system based on a minimum distance according to one embodiment.
Figure 11:
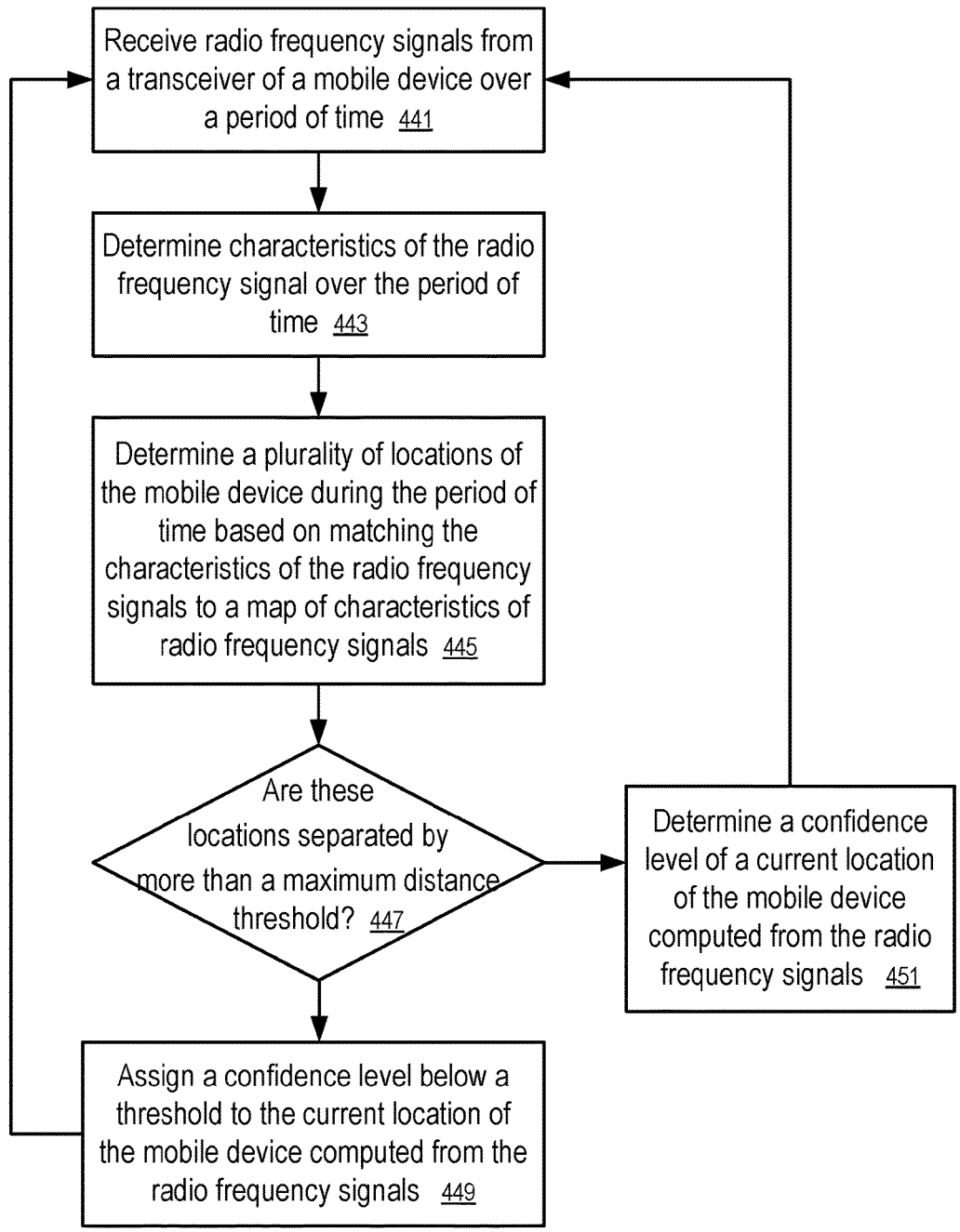
FIG. 11 shows a method to filter the location determination results from a radio frequency position determination system based on a maximum distance according to one embodiment.

In some instances, when the results of the radio frequency navigation system are determined to have a confidence level lower than a threshold, the results can be discarded in favor of the results from the inertial navigation system, as illustrated FIGS. 9-11.

FIG. 9 shows a method to combine the location determination results from an inertial position determination system and a radio frequency position determination system according to one embodiment. For example, the method of FIG. 8 can be implemented in the mobile device (101) illustrated in FIG. 2 or 5.

In FIG. 9, the radio frequency navigation system of the mobile device (101) determines (401) a current location of a mobile device (101) based on a signal map (317) of radio frequency signal characteristics. For example, the current location can be determined by the radio frequency navigation system without the use of location data from the inertial navigation system, as discussed in connection with FIG. 6, or determined with the location data from the inertial navigation system to construct a local distribution as discussed in connection with FIGS. 7 and 8.

In FIG. 9, the inertial navigation system of the mobile device (101) determines (409) a current location of the mobile device (101) based on inputs from inertial sensors (e.g., motion sensors (121)).

In FIG. 9, when the confidence level of the current location of the mobile device (101) determined by the radio frequency navigation system is below (403) a first threshold, the current location determination result determined by the radio frequency navigation system is discarded.

In FIG. 9, when the confidence level of the current location of the mobile device (101) determined by the radio frequency navigation system is above (405) a second threshold, the current location determination result determined by the radio frequency navigation system is used to initialize (407) inertial based location calculation. Thus, the inertial navigation system of the mobile device (101) is re-initialized or calibrated using the result of the radio frequency navigation system.

In FIG. 9, when the confidence level of the current location of the mobile device (101) determined by the radio frequency navigation system is between (403, 405) the first threshold and the second threshold, the mobile device (101) determines (411) a current location of the mobile device based on a weighted average of the current location determined from the map and the current location determined from the inertial sensor inputs.

The mobile device (101) may or may not use the current location of the mobile device determined from the weighted average to reinitialize the inertial navigation system.

In some instances, the second threshold is the confidence level of the location determination result of the inertial navigation system.

FIG. 10 shows a method to filter the location determination results from a radio frequency position determination system based on a minimum distance according to one embodiment. For example, the filtering can be performed in connection with the first threshold of FIG. 9 and implemented in the mobile device (101) illustrated in FIG. 2 or 5.

In FIG. 10, using the radio frequency signals received (421) from a transceiver (123) of a mobile device (101) over a period of time, the radio frequency navigation system of the mobile device (101) determines (423) characteristics of the radio frequency signal over the period of time and determines (425) a plurality of locations of the mobile device during the period of time, based on matching the characteristics of the radio frequency signals to a map (317) of characteristics of radio frequency signals.

If the mobile device (101) determines (427) that these locations, determined by the radio frequency navigation system, are within a minimum distance threshold from each other, the mobile device (101) assigns (429) a confidence level below a threshold (e.g., the first threshold in FIG. 9) to the current location of the mobile device (101) computed from the radio frequency signals; otherwise, the mobile device (101) determines (431) a confidence level of a current location of the mobile device computed from the radio frequency signals based on other considerations (e.g., the gradient of the characteristics of radio frequency signals at the determined location, the presence of similar characteristics of radio frequency signals at different locations in the map, a maximum threshold distance discussed below).

In one embodiment, when the successive locations of the mobile device (101) during a period of time as determined from the signal map (317) are within a circle of a predetermined radius, or within a minimum distance from each other, the mobile device (101) computes an average of the successive locations and uses the average to represent the location of the mobile device within the period of time.

FIG. 11 shows a method to filter the location determination results from a radio frequency position determination system based on a maximum distance according to one embodiment. For example, the filtering can be performed in connection with the first threshold of FIG. 9 and implemented in the mobile device (101) illustrated in FIG. 2 or 5. The filtering methods of FIGS. 10 and 11 can be used together. Alternatively, one of the filtering methods of FIGS. 10 and 11 is used without another.

In FIG. 11, the mobile device (101) receives (441) radio frequency signals from a transceiver (123) over a period of time to determine (443) characteristics of the radio frequency signal over the period of time. The radio frequency navigation system of the mobile device (101) determines (445) a plurality of locations of the mobile device during the period of time, based on matching the characteristics of the radio frequency signals to a map (317) of characteristics of radio frequency signals.

If the mobile device (101) determines (447) that these locations, determined by the radio frequency navigation system, are separated by more than a maximum distance threshold, the mobile device (101) assigns (449) a confidence level below a threshold (e.g., the first threshold in FIG. 9) to the current location of the mobile device computed from the radio frequency signals; otherwise, the mobile device determines (451) a confidence level of a current location of the mobile device computed from the radio frequency signals based on other considerations (e.g., the gradient of the characteristics of radio frequency signals at the determined location, the presence of similar characteristics of radio frequency signals at different locations in the map, a minimum threshold distance discussed above).

In one embodiment, the maximum distance threshold is more than a typical distance traveled by the user of the mobile device during the period of time in an indoor environment (e.g., illustrated in FIG. 1). For example, the mobile device (101) (or a separate server) tracks the historic speeds of the user traveling within the indoor environment and computes an average speed of the user from the tracked speeds. The maximum threshold distance can be computed for the period of time based on the average speed (e.g., a predetermined number of times of the distance traveled during the period of time at the average speed). Alternatively, a maximum observed speed can be computed from the tracked speed to compute the maximum threshold distance. In some instances, the maximum threshold distance can be computed based on a typical walking speed of an adult. In other instances, the maximum threshold distance can be computed based on the current speed of the mobile device as determined by the inertial navigation system.

In some embodiments, the inertial navigation system uses the measurements from the magnetic field sensor (313) and/or the gyroscopes (315) to determine the orientation of the mobile device (101) and combines the orientation of the mobile device (101) with the measurements from the accelerometers (311) to incrementally update the location of the mobile device over a period of time.

However, the mobile device (101) may or may not have a fixed orientation with respect to the user of the mobile device (101). Thus, the heading of the mobile device (101) may not accurately reflect the heading of the user. The heading of the user can be used to predict the next location of the user and evaluate the confidence level of a subsequently computed location (e.g., from the inertial navigation system and/or the radio frequency navigation system). In one embodiment, the mobile device (101) ignores the heading data of the mobile device and computes the heading from the vectors defined by the successive locations of the mobile device (101), as illustrated in FIG. 12.

Figure 12:
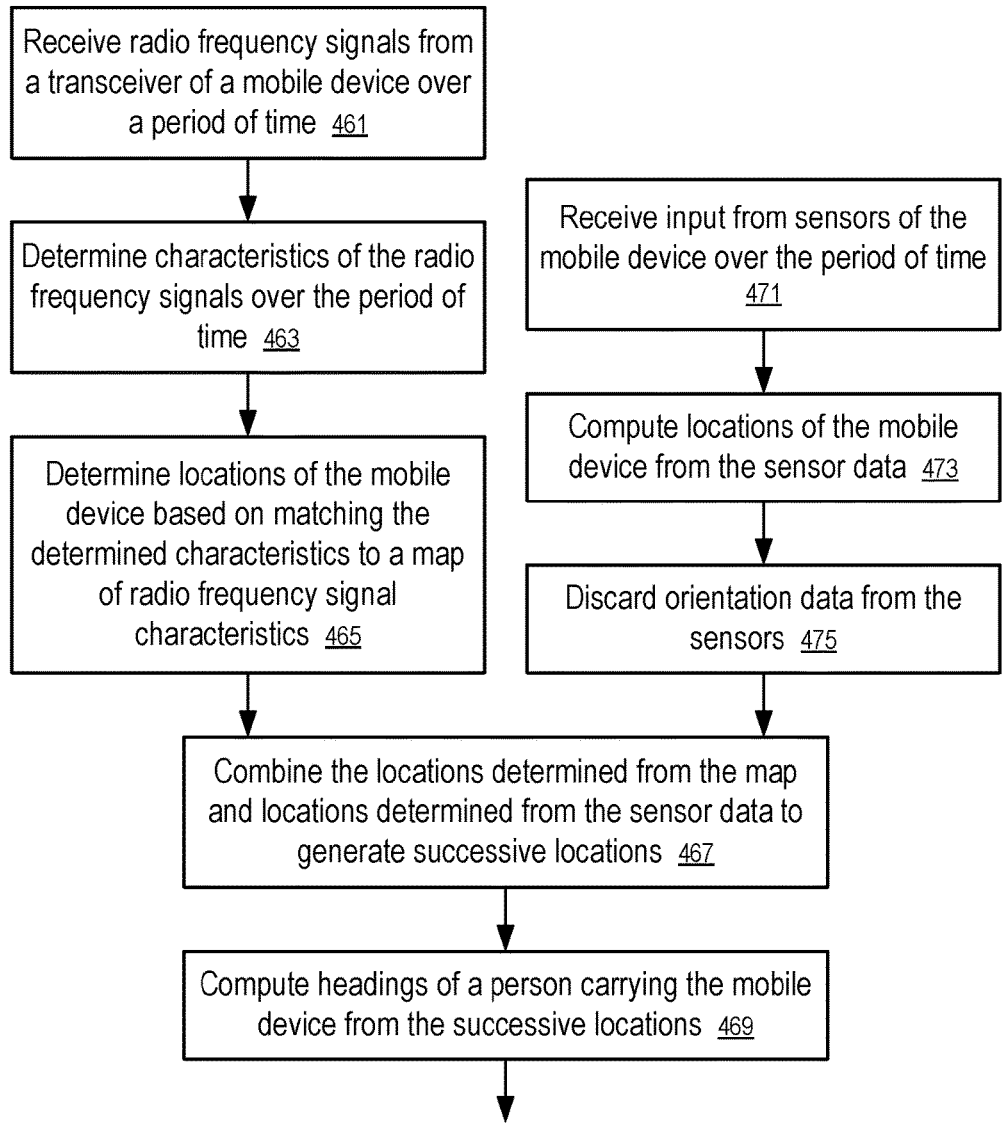
FIG. 12 shows a method to determine the heading of a person carrying a mobile device according to one embodiment.

FIG. 12 shows a method to determine the heading of a person carrying a mobile device according to one embodiment. For example, the method of FIG. 12 can be implemented in the mobile device (101) illustrated in FIG. 2 or 5.

In FIG. 12, the radio frequency navigation system of the mobile device (101) receives (461) radio frequency signals from a transceiver (123) over a period of time to determine (463) characteristics of the radio frequency signals over the period of time and determine (465) locations of the mobile device based on matching the determined characteristics to a map of radio frequency signal characteristics.

In FIG. 12, the inertial navigation system of the mobile device (101) receives (471) input from sensors of the mobile device over the period of time to compute (475) locations of the mobile device from the sensor data. The mobile device discards (473) orientation data from the sensors and combines (467) the locations determined from the map and the locations determined from the sensor data to generate successive locations. The combination of location data can be performed using one or more of the techniques discussed in connection with FIGS. 6-9.

The mobile device computes (469) headings of a person carrying the mobile device from the successive locations. The computed heading of the user can be used to predict the next location of the user and evaluate the confidence level of a subsequently computed location (e.g., from the inertial navigation system and/or the radio frequency navigation system).

Figure 4:
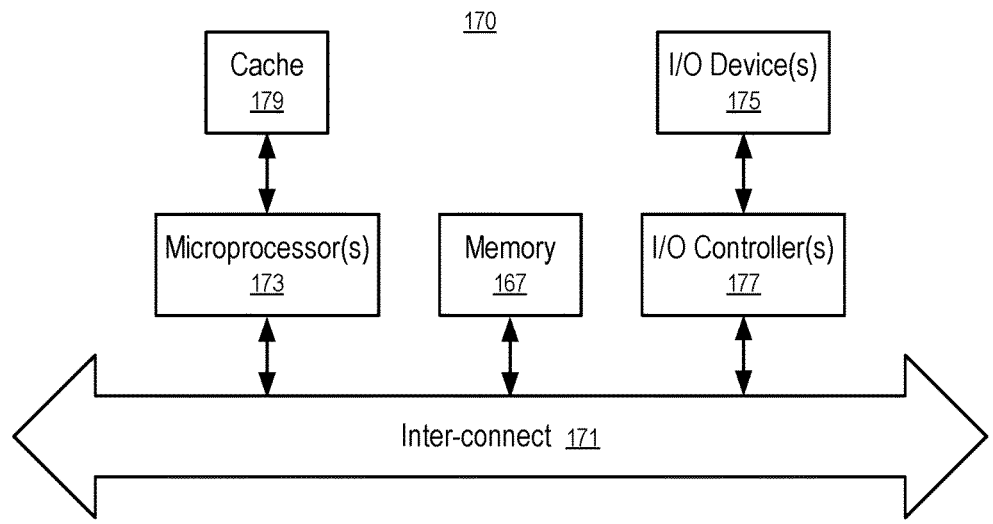
FIG. 4 illustrates a data processing system according to one embodiment.

FIG. 4 illustrates a data processing system according to one embodiment. For example, the data processing system of FIG. 4 can be used to implement each of the mobile device (101), the beacons (103, 105), the Wi-Fi Access Point (107), and/or a centralized remote service discussed above.

While FIG. 4 illustrates various components of a computer system, it is not intended to represent any particular architecture or manner of interconnecting the components. One embodiment may use other systems that have fewer or more components than those shown in FIG. 4.

In FIG. 4, the data processing system (170) includes an inter-connect (171) (e.g., bus and system core logic), which interconnects a microprocessor(s) (173) and memory (167). The microprocessor (173) is coupled to cache memory (179) in the example of FIG. 4.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method to determine a location of a mobile device, the method comprising:
   storing, in the mobile device, a map of radio frequency signal characteristics in a region identified in the map;
   receiving, in a transceiver of the mobile device during a period of time, radio frequency signals in the region emitted from a plurality of beacons located in a multi-floor transport corridor within the region;
   determining, by the mobile device, characteristics of the radio frequency signals received in the transceiver, the characteristics comprising signal strength levels of the radio frequency signals;
   matching, by the mobile device, the characteristics of the radio frequency signals with the frequency signal characteristics of the map;
   determining, by the mobile device, a plurality of successive locations based on the matching;
   identifying, by the mobile device, a pattern of the plurality of successive locations during the period of time;
   in response to the pattern being identified in the plurality of successive locations, assigning, by the mobile device, below a threshold a confidence level of the plurality of successive locations as locations of the mobile device;
   computing a weighted average of a first location of the mobile device from the map and a second location of the mobile device from inertial sensor measurements, the weighting based on the confidence level of the plurality of successive locations;
   determining, based on the weighted average, a current location of the mobile device;
   determining a movement speed of the mobile device based on the signal strength levels of the radio frequency signals; and
   modifying the current location of the mobile device based on the movement speed of the mobile device and an expected traffic flow along the multi-floor transport corridor.

2. The method of claim 1, wherein the pattern includes the plurality of successive locations being within a circle having a radius of a predetermined threshold.

3. The method of claim 2, further comprising:
   computing an average of the plurality of successive locations during the period of time; and
   providing the average as a location of the mobile device during the period of time.

4. The method of claim 1, wherein the pattern includes the plurality of successive locations being within a predetermined minimum threshold distance from each other.

5. The method of claim 1, wherein the pattern includes the plurality of successive locations being separated by a predetermined maximum threshold distance from each other.

6. The method of claim 5, wherein the maximum threshold distance is more than a typical distance traveled by a user during the period of time in an indoor environment.

7. The method of claim 6, further comprising:
   tracking speeds of the user traveling within the indoor environment;
   computing an average speed of the user from the tracked speeds; and
   computing the maximum threshold distance for the period of time based on the average speed.

8. The method of claim 6, wherein the maximum threshold distance is computed based on a speed of the mobile device.

9. The method of claim 3, further comprising:
   determining the speed of the mobile device based on measurements from inertial sensors of the mobile device.

10. The method of claim 1; further comprising:
    determining a location of the mobile device based on measurements from inertial sensors of the mobile device; and
    discarding the plurality of successive locations in position determination for the mobile device when the confidence level is below the threshold.

11. The method of claim 1, wherein the first location and the second location are weighted according to a confidence level of the first location as the current location of the mobile device and a confidence level of the second location as the current location of the mobile device respectively in computing the weighted average.

12. A non-transitory computer storage medium storing instructions which when executed on a mobile device, cause the mobile device to perform a method in determining a location of the mobile device, the method comprising:
    storing, in the mobile device, a map of radio frequency signal characteristics in a region identified in the map;
    receiving, in a transceiver of the mobile device during a period of time, radio frequency signals in the region emitted from a plurality of beacons located in a multi-floor transport corridor within the region;

determining, by the mobile device, characteristics of the radio frequency signals received in the transceiver, the characteristics comprising signal strength levels of the radio frequency signals;

matching, by the mobile device, the characteristics of the radio frequency signals with the frequency signal characteristics of the map;

determining, by the mobile device, a plurality of successive locations based on the matching;

identifying, by the mobile device, a pattern of the plurality of successive locations during the period of time;

in response to the pattern being identified in the plurality of successive locations, discarding, by the mobile device, the plurality of successive locations in positioning determination of the mobile device;

computing a weighted average of a first location of the mobile device from the map and a second location of the mobile device from inertial sensor measurements, the weighting based on the confidence level of the plurality of successive locations;

determining, based on the weighted average, a current location of the mobile device;

determining a movement speed of the mobile device based on the signal strength levels of the radio frequency signals; and modifying the current location of the mobile device based on the movement speed of the mobile device and an expected traffic flow along the multi-floor transport corridor.

13. The non-transitory computer storage medium of claim 1, wherein the characteristics of the radio frequency signals received in the transceiver include identifiers of sources located within an indoor environment that transmit the radio frequency signals.

14. The non-transitory computer storage medium of claim 13, wherein the characteristics of the radio frequency signals received in the transceiver include strength level indicators of the radio frequency signals transmitted from the source.

15. A mobile device, comprising:
a memory storing a map of radio frequency signal characteristics in a region identified in the map;
a transceiver to receive, during a period of time, radio frequency signals in the region emitted from a plurality of beacons located in a multi-floor transport corridor within the region;
inertial sensors to generate inertial sensor inputs; and
at least one microprocessor executing at least one mobile application to:
determine characteristics of the radio frequency signals received in the transceiver, the characteristics comprising signal strength levels of the radio frequency signals;
match the characteristics of the radio frequency signals with the frequency signal characteristics of the map to determine a plurality of successive locations during the period of time;
determine a first location based on the inertial sensor inputs;
identify a pattern of the plurality of successive locations during the period of time;
in response to the pattern being identified in the plurality of successive locations, discard the plurality of successive locations determined from the map in favor of the first location determined based on the inertial sensor inputs;
compute a weighted average of a first location of the mobile device from the map and a second location of the mobile device from inertial sensor measurements, the weighting based on the confidence level of the plurality of successive locations;
determine, based on the weighted average, a current location of the mobile device;
determine a movement speed of the mobile device based on the signal strength levels of the radio frequency signals; and
modify the current location of the mobile device based on the movement speed of the mobile device and an expected traffic flow along the multi-floor transport corridor.

16. The mobile device of claim 15, wherein the characteristics of the radio frequency signals received in the transceiver include an identifier of a source that transmits the radio frequency signals.

17. The mobile device of claim 15, wherein the inertial sensors include accelerometers and gyroscopes.

18. The mobile device of claim 15, wherein the radio frequency signals are signals for wireless local area networking or wireless personal area networking.

* * * * *